(12) United States Patent
Sigler et al.

(10) Patent No.: US 7,833,630 B2
(45) Date of Patent: Nov. 16, 2010

(54) WELDABLE METAL COMPOSITES AND METHODS

(75) Inventors: David R. Sigler, Shelby Township, MI (US); Xiaohong Q. Gayden, West Bloomfield, MI (US); Yen-Lung Chen, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 994 days.

(21) Appl. No.: 11/017,411

(22) Filed: Dec. 20, 2004

(65) Prior Publication Data

US 2006/0134395 A1  Jun. 22, 2006

(51) Int. Cl.
*B32B 15/06* (2006.01)

(52) U.S. Cl. .................. 428/625; 428/621; 428/624; 428/220; 428/332; 428/336; 428/457; 428/462; 428/463; 156/73.5; 219/78.01; 219/91.21

(58) Field of Classification Search .................. None
See application file for complete search history.

(56) References Cited

U.S. PATENT DOCUMENTS

| | | | | |
|---|---|---|---|---|
| 2,286,980 | A | 6/1942 | Schanz | 219/87 |
| 3,205,337 | A | 9/1965 | Hiemenz | 210/87 |
| 4,110,505 | A | 8/1978 | Prewo | 428/114 |
| 4,482,600 | A | 11/1984 | Matsumoto et al. | 428/213 |
| 4,650,723 | A | 3/1987 | Furuya | 428/622 |
| 4,678,707 | A | 7/1987 | Shinozaki et al. | 428/323 |
| 4,749,623 | A | 6/1988 | Endo et al. | 428/551 |
| 4,794,050 | A | 12/1988 | Campbell et al. | 428/551 |
| 4,873,149 | A | 10/1989 | Shinoda et al. | 428/609 |
| 4,978,582 | A | 12/1990 | Stamm et al. | 428/551 |
| 5,061,778 | A | 10/1991 | Uchida et al. | 528/45 |
| 5,084,357 | A | 1/1992 | Imai et al. | 428/461 |
| 5,100,737 | A | 3/1992 | Colombier et al. | 428/612 |
| 5,418,073 | A | 5/1995 | Loth et al. | 428/625 |
| 5,753,885 | A | 5/1998 | Iwasa et al. | 219/118 |
| 6,126,865 | A | 10/2000 | Haak et al. | 252/512 |
| 6,146,488 | A | 11/2000 | Okada et al. | 156/273.9 |
| 6,202,462 | B1 | 3/2001 | Hansen et al. | 72/199 |
| 6,465,110 | B1 | 10/2002 | Boss et al. | 428/608 |
| 2005/0133575 | A1 | 6/2005 | Gayden et al. | 228/235.2 |
| 2005/0244660 | A1* | 11/2005 | Yuasa et al. | 428/457 |
| 2006/0060296 | A1 | 3/2006 | Sigler et al. | 156/272.2 |

(Continued)

FOREIGN PATENT DOCUMENTS

JP  63-158242  7/1988

(Continued)

OTHER PUBLICATIONS

SAE Technical Paper Series 1999-01-1784, "Cost and Performance Benefits for Laminated Steel Body", by Thomas E. Welch and James R. Schwaegler, Proceedings of the 1999 Noise and Vibration Conference (P-342).

(Continued)

*Primary Examiner*—Monique R Jackson

(57) ABSTRACT

The present invention is directed to improved weldable metal composites and methods. A metal composite structure (10) features two metal members (12) (14) sandwiching a viscoelastic layer (26) where the viscoelastic layer entrains electrically conductive particles (28) and a carbon extracting attractant layers (32) (34) to inhibit and/or prevent carbon migration and carbide formation during welding.

32 Claims, 1 Drawing Sheet

U.S. PATENT DOCUMENTS

Figure 1:
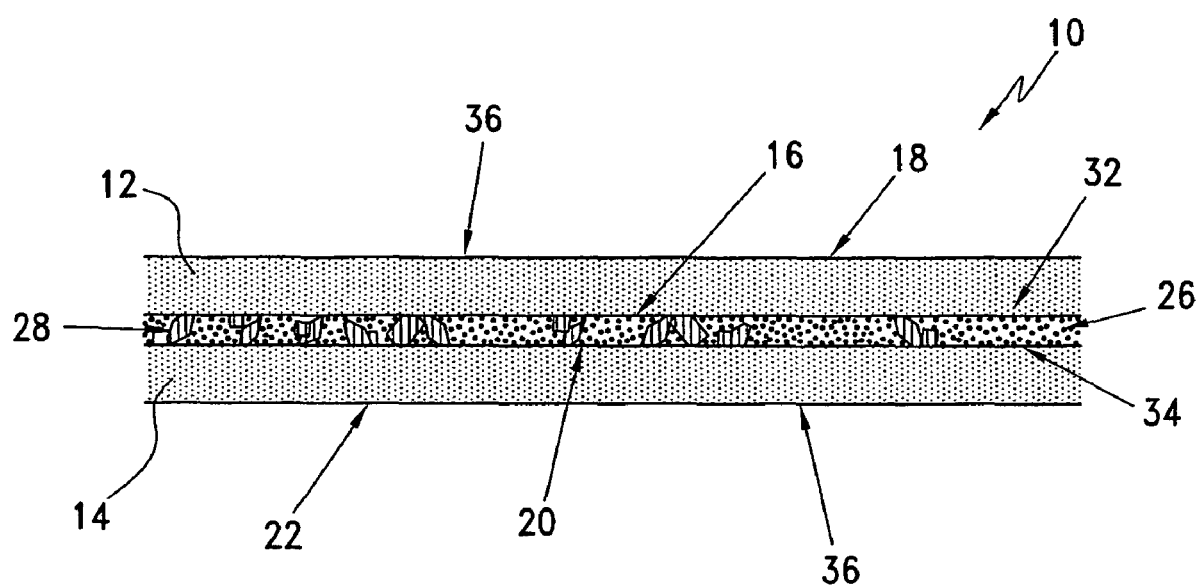

| | | | |
|---|---|---|---|
| 2006/0062977 A1 | 3/2006 | Sigler et al. | 428/209 |
| 2006/0134449 A1 | 6/2006 | Sigler et al. | 428/621 |
| 2006/0134450 A1 | 6/2006 | Sigler et al. | 428/621 |

FOREIGN PATENT DOCUMENTS

| | | | |
|---|---|---|---|
| JP | 01-263043 | | 10/1989 |
| JP | 02-231134 | | 9/1990 |
| JP | 03-193443 | | 8/1991 |
| JP | 04045922 A | * | 2/1992 |
| JP | 04-077245 | | 3/1992 |
| JP | 04-094928 | | 3/1992 |
| JP | 04-282239 | | 4/1992 |
| JP | 05-039560 | | 2/1993 |
| JP | 05-039561 | | 2/1993 |
| JP | 05042628 A | * | 2/1993 |
| JP | 05116266 A | * | 5/1993 |
| JP | 05-138802 | | 6/1993 |
| JP | 05-229054 | | 9/1993 |
| JP | 05-229055 | | 9/1993 |
| JP | 06-198802 | | 7/1994 |
| JP | 08-224827 | | 9/1996 |

OTHER PUBLICATIONS www.quietsteel.com/pressrelease-022003.html, MSC Engineered Materials and Solutions Group, "Quiet Steel™ Debuts on 2003 Cadillac (Feb. 20, 2003)".

U.S. Appl. No. 11/017,410, filed Dec. 20, 2004, entitled "Weldable Metal Composites and Methods".

McGraw-Hill Dictionary of Scientific and Technical Terms Fifth Edition, Sybil P. Parker, p. No. 1571.

* cited by examiner

WELDABLE METAL COMPOSITES AND METHODS

I. BACKGROUND OF THE INVENTION

1. Field of the Invention

The present invention relates to reducing carbon induced damage to resistance welded metal composites. More particularly, the present invention relates to sound damping, weldable, laminated metal composites possessing minimal alloying with carbon and/or carbide formation in the vicinity of welds from resistance spot welding.

2. Discussion of the Related Art

Metal composites are used to reduce noise and vibration in a wide range of applications. Such applications include automobiles or other vehicles, machinery, appliances, power equipment and the like. These metal composites typically include a viscoelastic layer disposed between (sandwiched by) two metal sheets.

In order to facilitate electrical conduction from the metal sheets and through the composite during the welding process, preferably, the viscoelastic layer is doped with electrically conductive particles. During resistance welding, the current flow from the welding electrode through the entrained, conductive particles generates sufficient heat at the weld zone to melt the conductive particles. Because the viscoelastic layer typically constitutes a polymeric mixture, the melting of conductive particles generates thermal gradients, causing discrete evaporation, and/or creating carbon residue. The molten particles in the viscoelastic layer may alloy directly with adjacent metal (primary alloys) or may first combine with other residues/thermal decomposition products from the heated viscoelastic material to then alloy with the metal (secondary alloys).

In the context of localized decomposition products of the viscoelastic layer around the conductive particles melt zone, elemental carbon is a particularly undesirable impurity. It is well known that carbon aggressively alloys with ferrous metals to reduce their melting points and/or form carbon-rich hard areas, and titanium to form carbides. In addition to the adverse metallurgical aspects on weld quality, the physical aspects of melting and local vaporization of the viscoelastic layer cause localized deterioration. Gas at high internal pressure is generated at or near the weld site. These physical anomalies occur in precisely the vicinity of undesirable selective alloying/metallurgical imperfections. The foregoing results not only in metallurgically degraded welds but also physically degraded structures, e.g., blisters or blowholes that adversely impact the composite's structural integrity.

Testing on low carbon steel composites has shown that melting/liquefied conductive particles, particularly those with significant presence of iron or nickel, will absorb or adsorb carbon from the decomposed viscoelastic layer. The resulting enriched carbon-containing compositions promote carbon diffusion into the metal sheets lowering the sheet's melting point and/or forming hard carbon rich areas including carbides. Consequently, the final welded region of the composite includes imperfections, inconsistencies, and other deleterious non-uniformities.

In view of the foregoing problems, it is clear that improvements can be made to the prior art.

II. SUMMARY OF THE INVENTION

It is, therefore, an object of the present invention to address and overcome problems of the prior art Another object of this invention is to provide an improved weldable composite and method for its formation.

A further object of the invention is to provide a weldable composite that minimizes carbon-induced damage, e.g., substrate dissolution from carbon alloying, formation of carbon-rich hard areas, and carbide formation, by incorporating elements that react with carbon.

Still another object of this invention is to provide a composite that possesses substantial weld quality, is relatively light weight, and provides sound/vibration damping.

A further object of the invention is to provide a weldable composite incorporating a carbon attractant to reduce undesirable carbide formation in carbide-forming alloy substrates such as titanium alloys.

A final stated, but only one of additional numerous objects of the invention, is to provide a weldable, sound damping composite incorporating carbon attractant deposits that during welding of the composite consolidate carbon and reduce contaminant migration from a sandwiched viscoelastic material to adjacent metal members and melted conductive particles and in the event that carbon is picked up by the melted conductive particles, reduce carbon migration from the melted particles to the metal member.

These and other objects are satisfied by a weldable metal composite, comprising, a first metal member and a second metal member; a viscoelastic layer disposed between said first and second metal members, electrically conductive particles dispersed in said viscoelastic layer, and at least a carbon attracting constituent associated with said viscoelastic layer; said at least carbon attracting constituent inhibiting transfer either directly or through the conductive particles to the metal member of carbon from the viscoelastic layer during welding of the composite.

The foregoing and other objects are satisfied by a method comprising the steps of making a metal composite comprising the steps of applying a viscoelastic layer between a first metal member and a second metal member where said viscoelastic layer includes electrically conductive particles, applying a carbon extracting attractant in association with said viscoelastic layer and a select one of said first or second metal members, and resistance welding said first metal member and said second metal member together and extracting carbon created by the welding with the carbon extracting attractant.

The present invention overcomes the limitations of the prior art by providing an effective deterrent to carbon pickup in the metal members. The deterrent may be in the form of layers or deposits of chromium, titanium, niobium, silicon, zirconium, and vanadium or alloys or compounds thereof, applied to the interior surfaces of the metal substrates. Accordingly, an important aspect of this invention is to provide a composite incorporating a carbide-forming deterrent, the composition of which will depend on the specific composition/metallurgy of the associated weldable metal members and the viscoelastic layer disposed therebetween. Preferably, the composition and physical structure of the deterrent is selected to maximize diffusion/migration inhibition of undesired carbon and carbide forming constituents into the metal of the weld. The deterrent may, for example, be in the form of particles or a continuous barrier applied to the interior surfaces of the metal substrates to inhibit localized development of excess carbides, selective local melting, and physical anomalies such as blowholes, blisters, etc.

An aspect of the present invention is directed to a metal composite comprising a metal sheet having an interior surface and an exterior surface and a metal article having a first surface and a second surface. A viscoelastic layer, preferably exhibiting adherent characteristics, and more preferably, exhibiting pressure sensitive adhesion, comprises conductive particles and is disposed between the interior surface of the metal sheet and the first surface of the metal article. Particles of iron, nickel, copper, or any electrically conductive alloys or compounds thereof may be employed and dispersed within the viscoelastic layer. The composite laminate further includes at least a first reactive, carbide forming carbon diffusion barrier disposed proximate to the interior surface of the aforementioned metal sheet and a second reactive barrier located proximate to the first surface of the metal article and may be established preferably, of chromium, titanium, niobium, silicon, zirconium, and vanadium or admixtures thereof. The first and second reactive barriers inhibit and/or prevent formation of primary alloys diffusion and/or migration of carbon and other degenerative products from the viscoelastic layer that form secondary alloys. Accordingly, the desirable metallurgical properties of the metal sheet and metal article will be maintained during welding of the composite.

Another aspect of the present invention is directed to a method of making a metal composite including the steps of applying an adhesive viscoelastic layer containing electrically conductive particles between an interior surface of a metal sheet and a first surface of a metal article and establishing at least one reactive, carbide forming carbon diffusion barrier associated with the interior surface of the metal sheet. In a preferred aspect of the invention, a second reactive barrier is associated with the first surface of the metal article where the first and second reactive barriers inhibit and/or prevent carbon diffusion and/or migration from the adhesive viscoelastic layer into the associated metal elements during resistance welding. Thus, the welded metal composite exhibits minimal damage resulting from, for example, non-uniform melting, local thinning, formation of blow holes, cracks or blisters, formation of hard carbon-rich areas, or formation of excessive carbide in the metal sheet and article.

During spot/resistive welding, an electric current initially flows between the metal sheet and the metal article via the conductive particles. The conductive particles dispersed within viscoelastic layer may be comprised of iron, nickel, copper, aluminum, phosphides, carbides or any electrically conductive alloys or compounds thereof. The metal elements, e.g., metal sheet and the metal article may be comprised of steel, including stainless steel or titanium alloys. In one embodiment, the reactive barrier constituents and the conductive particles are the same. That is, the particles dispersed throughout the viscoelastic layer are chromium, titanium, niobium, silicon, zirconium, vanadium, or combinations thereof.

As used herein "substantially," "generally," and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

In the following description, reference is made to the accompanying drawing, and which is shown by way of illustration to the specific embodiments in which the invention may be practiced. The following illustrated embodiments are described in sufficient detail to enable those skilled in the art to practice the invention. It is to be understood that other embodiments may be utilized and that structural changes based on presently known structural and/or functional equivalents may be made without departing from the scope of the invention.

Given the following detailed description, it should become apparent to the person having ordinary skill in the art that the invention herein provides a lightweight laminated, sound/vibration damping composite and method providing significantly augmented efficiencies while mitigating problems of the prior art.

III. BRIEF DESCRIPTION OF THE DRAWING

FIG. 1 is a cross-sectional view of a metal composite made in accordance with the present invention.

IV. DETAILED DESCRIPTION OF THE DRAWING

Referring to FIG. 1, shown is a metal composite 10 comprising a metal sheet 12 and a metal article 14. The metal article 14 may be any shape, including but not limited to a sheet; a longitudinal member including a tube, such as a hydroformed tube or a rail, such as a rail section in an automobile. In a preferred embodiment, the metal article 14 is a metal sheet as illustrated in FIG. 1 and the composite will have a total thickness of between about 0.3 mm and about 3.0 mm.

The metal sheet 12 includes an interior surface 16 and an exterior surface 18. Similarly, the metal article 14 has a first surface 20 and a second surface 22. The first surface 20 of the metal article 14 may be an interior surface, and the second surface 22 of the metal article may be an exterior surface. The metal sheet 12 and the metal article 14 may be comprised of any metal suitable for welding and susceptible to undesirable reactions with carbon around a weld. In the context of the present invention, the metal sheet 12 and/or the metal article 14 are typically composed of steel or titanium alloys. Where steel, preferably, it possesses one or more of the following characteristics: low carbon, interstitial free, bake hardenable, high strength low alloy, transformation induced plasticity (TRIP), martensitic, dual phase, galvanized, or stainless.

A viscoelastic layer 26 is disposed between the interior surface 16 of the metal sheet 12 and the first surface 20 of the metal article 14 and preferably exhibits sound/vibration damping characteristics. The viscoelastic layer typically has a thickness between about 0.005 mm and about 0.200 mm and, preferably, between about 0.02 mm and about 0.05 mm. The layer 26 may be comprised of any viscoelastic material, preferably being an adhesive, and more preferably, being a pressure sensitive adhesive effective for bonding the metal sheet 12 to the metal article 14. Such compositions are known to those having skill in the art. For example, layer 26 may be formed of poly(isoprene:styrene), poly (alkyl acrylate), copolymers, terpolymers, etc. thereof. Preferably, the pressure sensitive adhesive of the layer 26 is comprised of a poly(isoprene:styrene) copolymer.

Electrically conductive particles 28 which facilitate welding of the composite 10 are entrained within the layer 26. The conductive particles 28 may be composed of pure metals such as iron, nickel, copper, aluminum, alloys thereof, inorganic derivative, e.g., phosphides, electrically conductive organic polymers, etc. Preferably, the conductive particles 28 are comprised of nickel.

In FIG. 1, a first reactive carbon-attracting barrier 32 is in the form of a layer disposed on the interior surface 16 of the metal sheet 12. A second carbon-attracting reactive barrier 34 is in the form of a layer disposed on the first surface 20 of the metal article 14. The illustrated first and second reactive barrier layers 32 and 34 have a thickness from about 0.0005 mm and about 0.02 mm. Preferably, although not necessarily, each barrier layer 32 and 34 is continuous and has a thickness between about 0.002 mm and about 0.010 mm.

The presence and position of reactive barriers 32 and 34 prevent and/or inhibit carbon and other organics from the adhesive layer 26 from diffusing and/or migration into adjoining metal members during welding. The barriers 32 and 34 have an affinity for and react with the released carbon to form carbides before the carbon can migrate to and combine with the metal members. For ease of depiction, the barriers are illustrated as sheets rather than alternative forms, e.g. dispersed particles, and are composed of materials having an affinity for absorption or adsorption of carbon including, but not limited to chromium, titanium, niobium, silicon, zirconium, and vanadium. Preferably the barriers are composed of chromium or titanium. The barriers, when in the form of discrete layers, may be applied by conventional techniques such as electroplating, roll coating, spray coating, or vapor deposition.

Turning now to the effects of welding a composite 10 according to the foregoing, during the application of electrical current, the metal sheet 12 and the metal article 14 tend to draw closer together, thus, decreasing the physical space/gap separating interior metal sheet surface 16 and the first surface 20 of the metal article 14. The conductive particles 28 melt and the adhesive layer 26 decomposes in the region of the weld which results in generation of carbon as well as high gas pressure that may result in localized damage or dissolution of the metal sheet and metal article as previously described.

The presence of the reactive barrier layers 32 and 34 is of increased importance where the undesirable byproducts (primary alloys, secondary alloys, and high pressure gas) corrupt the integrity of the welded composite, by, for example, locally lowering the melting point below that of the original metal sheet or metal article, or forming carbon-rich hard areas in the original metal sheet or metal article. Consequently, the composition of the barrier layers 32 and 34 should be reactive with carbon, forming high melting point carbide.

Welding the composite 10 of the present invention may include welding the metal sheet 12 to the metal article 14, or it may include welding the entire composite to another structure or material. The composite 10 of the present invention is suitable for various types of welding including, but not limited to drawn arc welding and resistance welding including resistance spot welding and projection welding. The composite 10 of the present invention is particularly useful for resistance spot welding processes.

The composite 10 of the present invention may be any thickness; however, the composite is typically between about 0.30 mm and about 3.00 mm total thickness. Preferably, the composite 10 has a total thickness between about 0.6 mm and about 1.5 mm. The composite 10 possesses sound/vibration damping properties and is useful for numerous sound damping applications including, but not limited to use in automobiles or other vehicles, machinery, business equipment, appliances and power equipment. For example, the composite 10 may be used in the plenum, front of dash or floorpan of an automobile.

The present invention is also directed to a method of making the composite 10 described above. The method includes applying an adhesive layer 26 between the interior surface 16 of a metal sheet 12 and the first surface 20 of a metal article 14. The adhesive layer 26 may be applied by any method known to those having skill in art, including but not limited to extrusion, roll coating or spray coating.

A first reactive barrier layer 32 is applied on the interior surface 16 of the metal sheet 12 and a second reactive barrier layer 34 is applied on the first surface 20 of the metal article 14. The barrier layers 32 and 34 prevent and/or inhibit the diffusion and/or migration of carbon from the adhesive layer 26 into the metal sheet 12 and the metal article 14, respectively, during welding of the composite 10. Each barrier layer 32 and 34 may be applied to the interior surface 16 of the metal sheet 12, and the first surface 20 of the metal article 14, respectively, by any method known to those having skill in the art, including but not limited to electroplating, hot dip coating, roll coating, spray coating, or vapor deposition.

A coating 36, such as a galvanized coating, may be applied to the exterior surface 18 of the metal sheet 12 and the second surface 22 of the metal article 14 to prevent or inhibit corrosion or rusting of the metal sheet and metal article.

Specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. A weldable metal composite, comprising:
   a first metal member and a second metal member;
   a viscoelastic layer comprising a polymer comprising carbon disposed between said first and second metal members and bonding at least a portion of the first and second metal members together prior to welding of the composite, wherein said viscoelastic layer is a pressure sensitive adhesive;
   electrically conductive particles dispersed in said viscoelastic layer; and
   a carbon extracting attractant associated with said viscoelastic layer; said carbon extracting attractant inhibiting transfer of carbon to the first metal member or second metal member during welding of the composite by forming carbides with carbon released from the viscoelastic layer.

2. The metal composite according to claim 1 wherein the carbon extracting attractant is in the form of at least one reactive barrier layer.

3. The metal composite according to claim 2 wherein the carbon extracting attractant comprising at least one of chromium, titanium, niobium, silicon, zirconium, vanadium and admixtures thereof and alloys thereof.

4. The metal composite according to claim 2 wherein the said carbon extracting attractant is deposited between said viscoelastic layer and said first metal member and wherein said metal composite further comprises a second deposit of a carbon extracting attractant between said viscoelastic layer and said second metal member.

5. The metal composite according to claim 1 wherein said pressure sensitive adhesive comprises at least one of: poly (isoprene:styrene) or copolymers or terpolymers thereof; or poly (alkyl acrylate) or copolymers or terpolymers thereof.

6. The metal composite according to claim 1 wherein the deposited carbon extracting attractant has a depth of about 0.0005 mm to about 0.02 mm.

7. The metal composite according to claim 6 wherein the deposited carbon extracting attractant has a depth of about 0.002 mm and about 0.010 mm.

8. The metal composite according to claim 1 wherein said conductive particles comprise at least one of iron, nickel, copper, aluminum, and or electrically conductive alloys or compounds thereof.

9. The metal composite according to claim 1, wherein said first metal member and said second metal member are composed of a material selected from the group consisting of steel and titanium alloy.

10. The metal composite according to claim 9, wherein at least one of said first and second metal members is composed of steel characterized by properties selected from the group consisting of low carbon, interstitial free, bake hardenable, high strength, low alloy, transformation induced plasticity, martensite, dual phase, and galvanized steel.

11. The metal composite according to claim 3, wherein the composite is between about 0.30 mm and about 3.00 mm total thickness.

12. The metal composite of claim 11, wherein the composite is between about 0.60 mm and about 1.50 mm total thickness.

13. The metal composite according to claim 1 further comprising:
a corrosion inhibiting coating applied to an exterior surface of said first metal member such that said first metal member is located between said viscoelastic layer and said corrosion inhibiting coating.

14. The metal composite according to claim 13 further comprising:
a corrosion inhibiting coating applied to an exterior surface of said second metal member such that said second metal member is located between said viscoelastic layer and said corrosion inhibiting coating.

15. The metal composite according to claim 1 wherein the carbon extracting attractant comprises a layer of particles comprising at least one of chromium, titanium, niobium, silicon, zirconium, vanadium and admixtures thereof and alloys thereof deposited on at least one of the first or second metal member.

16. The metal composite according to claim 1 wherein the carbon extracting attractant comprises a clad layer comprising at least one of chromium, titanium, niobium, silicon, zirconium, vanadium and admixtures thereof on at least one of the first or second metal member.

17. A sound damping composite structure comprising:
a first steel sheet having an interior surface and an exterior surface;
a second steel sheet having an interior surface and an exterior surface;
a pressure sensitive adhesive layer comprising a polymer comprising carbon located between the interior surface of the first steel sheet and the interior surface of the second steel sheet bonding at least a portion of the first steel sheet and second steel sheet together prior to welding of the composite, the adhesive layer comprising conductive particles which allow electric current to flow between the first and second steel sheets during welding of the composite;
a first carbon extracting attractant deposit located in a zone proximate to the boundary between the interior surface of the first steel sheet and the adhesive layer; and
a second carbon extracting attractant deposit in a zone proximate to the boundary between the interior surface of the second steel sheet and the adhesive layer, the first and second carbon extracting attractant able to inhibit diffusion of carbon from the adhesive layer into the steel sheets during welding of the composite by forming carbides therewith.

18. The metal composite of claim 17, wherein the composite has a thickness of between about 0.30 mm and about 3.00 mm and is resistance spot weldable.

19. The metal composite according to claim 17 wherein each of said first and second carbon extracting attractant deposits are in the form of barrier layers and comprise at least one of chromium, titanium, niobium, silicon, zirconium, vanadium admixtures thereof and alloys thereof.

20. The metal composite according to claim 17 wherein said pressure sensitive adhesive layer comprises at least one of: poly(isoprene:styrene) or copolymers or terpolymers thereof; or poly (alkyl acrylate) or copolymers or terpolymers thereof.

21. The metal composite according to claim 17 further comprising:
a corrosion inhibiting coating applied to an exterior surface of said first steel sheet such that said first steel sheet is located between said adhesive layer and said corrosion inhibiting coating.

22. The metal composite according to claim 21 further comprising:
a corrosion inhibiting coating applied to an exterior surface of said second steel sheet such that said second steel sheet is located between said adhesive layer and said corrosion inhibiting coating.

23. A method comprising:
applying a viscoelastic layer comprising a polymer comprising carbon between a first metal member and a second metal member thereby bonding at least a portion of the first metal member and second metal member prior to resistance welding the first metal member and second metal member, wherein said viscoelastic layer is a pressure sensitive adhesive and includes electrically conductive particles;
forming a carbon extracting attractant deposit together and associated with the viscoelastic layer and said first metal member; and
resistance welding said first metal member and said second metal member together, and inhibiting the formation of primary and secondary alloys by preventing migration of carbon from said viscoelastic layer to said first metal member wherein the carbon extracting attractant forms a carbide with the carbon.

24. The method according to claim 23, further comprising the step of making a second carbon extracting attractant deposit associated with the viscoelastic layer and said second metal member.

25. The method according to claim 24 further providing sound/vibration damping characteristics to the welded composite and maintaining the total thickness of the composite between about 0.3 mm and about 3.0 mm.

26. The method according to claim 23 further comprising:
applying a corrosion inhibiting coating to an exterior surface of said first metal member such that said first metal member is located between said viscoelastic layer and said corrosion inhibiting coating.

27. The method according to claim 26 further comprising:
applying a corrosion inhibiting coating to an exterior surface of said second metal member such that said second metal member is located between said viscoelastic layer and said corrosion inhibiting coating.

28. A method comprising;
forming a first reactive barrier on a first metal member, the first reactive barrier comprising a carbon extracting attractant;
forming a second reactive barrier on a second metal member, the second reactive barrier comprising a carbon extracting attractant;
laminating the first metal member and second metal member together, prior to resistance welding the first metal member and second metal member, comprising providing a viscoelastic layer comprising a polymer comprising carbon between the first metal member and second metal member, wherein the viscoelastic layer is a pressure sensitive adhesive and comprises electrically conductive particles;

resistance welding said first metal member and second metal member together and wherein the carbon extracting attractant forms carbides with the carbon thereby inhibiting the transfer of carbon to the first metal member or to the second metal member; and applying a corrosion inhibiting coating to an exterior surface of at least one of the first metal member or the second metal member such that the metal member is located between the viscoelastic layer and the corrosion inhibiting coating.

29. The method according to claim 28 wherein the carbon extracting attractant is selected from the group consisting of chromium, titanium, niobium, silicon, zirconium, vanadium and admixtures thereof and alloys thereof.

30. The method according to claim 29 wherein each of the first and second barrier layer has a depth of about 0.0005 mm to about 0.02 mm.

31. The method according to claim 28 wherein the carbon extracting attractant comprises particles comprising at least one of chromium, titanium, niobium, silicon, zirconium, vanadium and admixtures thereof.

32. The method according to claim 28 wherein the carbon extracting attractant comprises a clad layer comprising at least one of chromium, titanium, niobium, silicon, zirconium, vanadium and admixtures thereof.

* * * * *